Feb. 14, 1928.    
C. PEARSON    
1,658,999  
TILTING DEVICE FOR CUTTER BARS OF MOWING MACHINES  
Filed Oct. 31, 1923

Inventor.  
Charles Pearson,  
By H. P. Daveute  
Atty.

Patented Feb. 14, 1928.

1,658,999

UNITED STATES PATENT OFFICE.

CHARLES PEARSON, OF CHICAGO, ILLINOIS, ASSIGNOR TO INTERNATIONAL HARVESTER COMPANY, OF CHICAGO, ILLINOIS, A CORPORATION OF NEW JERSEY.

TILTING DEVICE FOR CUTTER BARS OF MOWING MACHINES.

Application filed October 31, 1923. Serial No. 671,868.

The present invention relates to mowing machines and, more particularly, to an improved means for permitting a rocking or tilting movement of the cutter bars of such machines.

In the operation of a mower, it is essential that the cutter bar thereof be tiltable or rockable, so that it may ride over stones and other slight obstructions in the field without causing injury to the cutting knives. It is appreciated that such means is well known and in use, but most of them are manually operable and depend entirely upon the alertness of the operator, who must pull a lever or the like to tilt or rock the cutter bar, should he see an obstruction.

Thus, the principal objects of this invention are: first, to provide a tilting mechanism for the cutting bar of a mower, which is automatic in operation and entirely independent of the operator of the machine; second, to provide a mechanism which will permit automatic tilting and which may be adjusted or regulated to control the extent of such rocking or tilting movement of the cutter bar; and third, to provide an automatic tilting device of simple and rugged construction, readily adapted to use in conventional mowers. Other objects will be apparent to those skilled in the art to which this invention appertains, as the description thereof progresses. In the accompanying sheet of drawings forming a part of this application:

Figure 1:
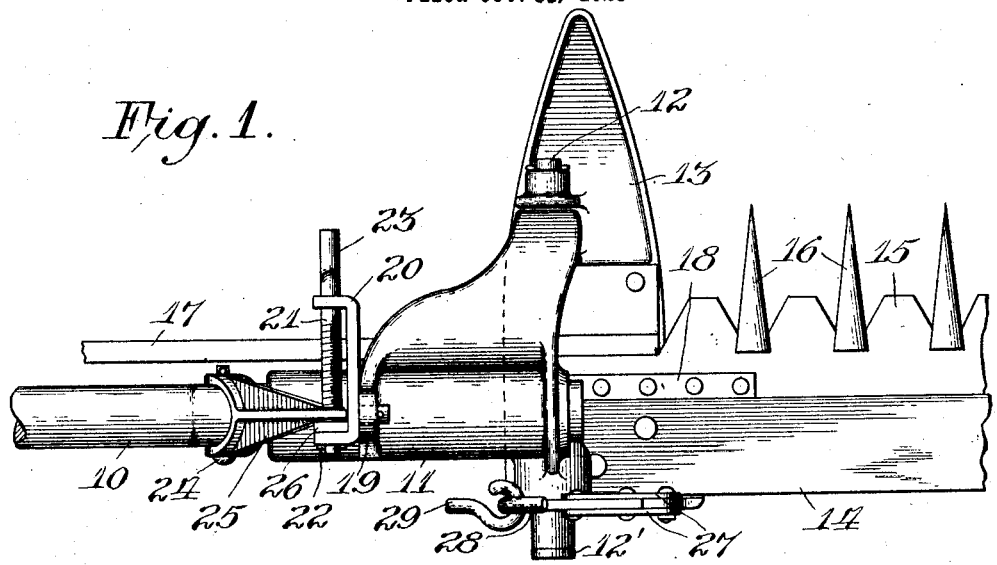
Fig. 1 is a plan view of a mower frame and a cutter bar attached thereto in association with the improved tilting mechanism.
Figure 2:
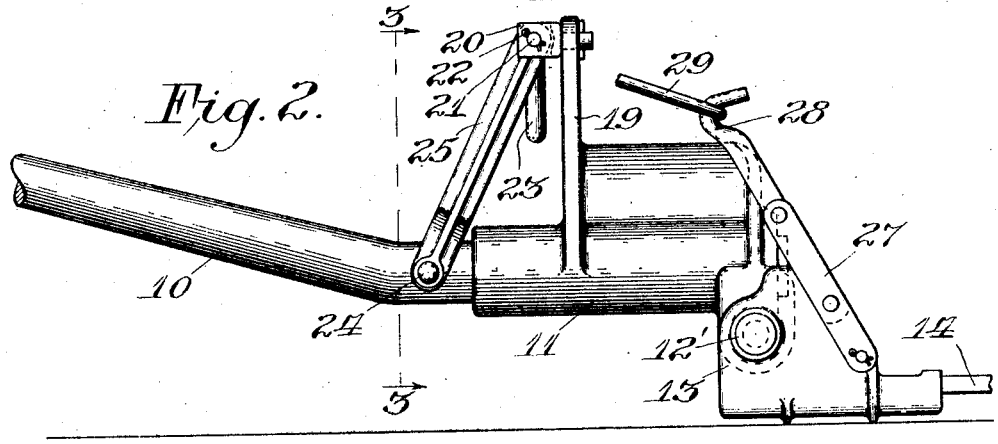
Fig. 2 is a similar view showing the same structure viewed from the rear.

The preferable embodiment of this invention is disclosed in connection with a conventional mower having a coupling arm member 10 and a bifurcated coupling yoke member 11 rockably mounted on the grassward end thereof. Pivoted to the grassward end of this coupling yoke by means of pins 12 and 12' is a runner shoe 13 supporting the usual cutter bar 14 having reciprocating knives 15 mounted thereon and operable between guard fingers 16. The knives 15 are reciprocated in a conventional manner by means of a pitman 17 operatively connected thereto by means of knife-head 18.

In the operation of mowing machines of this type in the field, it is necessary that the cutter bar be tiltable or rockable, so that it may ride over small obstructions, as heretofore stated. It is also highly desirable that such means be automatic and entirely independent of the operator of the machine. To accomplish this the following mechanism, to be now described, has been provided.

The coupling yoke 11 carries an integral upstanding supporting member 19. Adjacent the upper end of this supporting member and on the stubbleward side thereof is pivotally carried a U-shaped bracket 20 having rotatably journaled therein a screw-threaded pin 21. This pin is held against longitudinal movement in the bracket by means of a cotter pin 22 at one end thereof and a crank handle 23 at its opposite end. The coupling arm 10, it will be observed, pivotally supports, by means of a pin 24, an upstanding grasswardly inclined supporting member 25. This upstanding member is provided at its upper end with an integral eye, though which loosely passes the pin 21 journaled in the bracket 20. The coupling yoke member 11 may thus rock relatively to the frame pipe 10 because the arm 19 and the pin 21 carried thereby may freely slide relative to the support 25 because the pin 21 is loose in the eye on the upper end of the support 25.

From the above description, it will be quite apparent that, should the guard fingers 16 of the cutter bar strike a small obstruction, such as a stone or the like, in the field the cutter bar will ride over the same by tilting or rocking upwardly, and, as the cutter bar is supported by the rockable coupling yoke member 11 carrying the bracket 20, this motion will move the same longitudinally of the relatively stationary member 25 carried by the frame 10. Of course, as soon as the obstruction has been passed, the weight of the bar will return it to normal ground engaging position, as the loose connection just described will readily permit such movement.

It may be desirable at times to regulate the extent of throw or rocking movement of the cutter bar, and, for this purpose, it will be noted that the threaded pin 21 carries a stationary nut 26, which is held against rotation by having one of its faces abut the side of the bracket 20. Thus, if the operator wishes to limit the movement of the cutter bar, he need only grasp the crank handle 23 and rotate the same, whereupon the bracket 20, and with it the coupling yoke 11 and cutter bar, will be moved rearwardly and held in such position by means of the stationary nut just described and the frame member 25 which abuts thereagainst. At times, obstructions will be encountered which will be too large for the tilting mechanism just described, and it may be necessary to lift the entire cutter bar to plain lift position. For this purpose, there is provided a pair of straps or link members 27 pivoted at their lower ends to the shoe 13. At the upper ends of these straps and between the same is fixed a pull hook 28 having operative connection, by means of a link 29, to a lever, not shown, adjacent the seat of the operator. The operator may thus pull the lever, and, through the connections described, raise the cutter bar about the pivots 12 and 12' to plain lift position.

Figure 3:
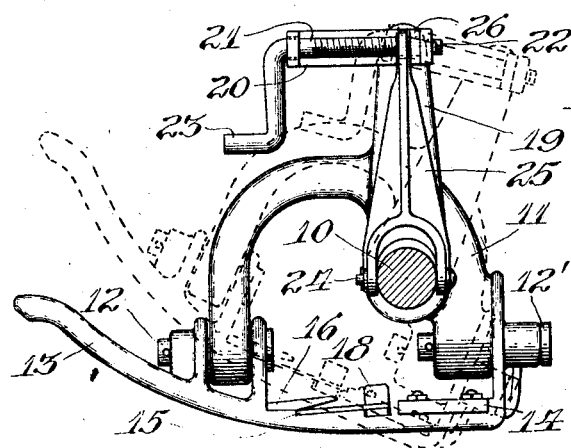
Fig. 3 is an end elevational view taken along the line 3—3 of Fig. 2 looking in the direction of the arrows.

It will be observed from Fig. 3, as shown in dotted lines, that the extent of automatic tilt of which this device is capable is quite considerable. It will further be observed that the device is simple, having but few parts, and is well adapted to the purpose for which it is intended.

While I have shown the preferred form of the invention, it is to be understood that various changes in construction and arrangement of parts may be made by those skilled in the art without departing from the invention as hereafter claimed.

What I claim is:

1. In a mowing machine having a coupling arm, a coupling yoke rockably mounted on said arm, a cutter bar pivoted to the yoke, and cooperating means carried entirely on said arm and yoke for permitting an automatic tilt of said cutter bar.

2. In a mowing machine having a coupling arm, a coupling yoke rockably mounted on said arm, a cutter bar pivoted to the yoke, and cooperating means carried entirely on said arm and yoke to permit an automatic tilt of said cutter bar, said means including an adjustable member for limiting the amount of tilt of said bar.

3. In a mowing machine having a coupling arm, a coupling yoke rockably mounted on said arm, a cutter bar pivoted to said yoke, means permitting automatic tilting of said bar, and means carried on the yoke for tilting the yoke independently of the arm to regulate and control the amount of tilt of said cutter bar.

4. In a mowing machine having a coupling arm, a coupling yoke rockable thereon, a cutter bar connected to the yoke, and cooperating mechanism carried entirely on the arm and yoke including an adjustable threaded member for permitting an automatic limited tilting action of the cutter bar.

5. In a mowing machine, a coupling arm, a coupling yoke rockably mounted thereon, a cutter bar pivoted to the coupling yoke, a member pivotally mounted on the arm, said coupling yoke carrying means slidably engaging said pivoted member to permit a tilting movement of the cutter bar and coupling yoke relative to the pivoted member.

6. In a mowing machine, a coupling arm, a coupling yoke rockably mounted on said arm, a cutter bar connected to the yoke, and relatively slidable cooperating means carried entirely on said yoke and arm for permitting an automatic tilting action of the cutter bar.

7. In a mowing machine, a coupling arm, a coupling yoke rockably mounted on said arm, a cutter bar connected to the yoke, and relatively slidably cooperating means carried entirely on said yoke and arm for permitting an automatic tilting action of the cutter bar, said means including an adjustable stop member for regulating the amount of tilt of said bar.

8. In a mowing machine, a coupling arm, a coupling yoke rockably mounted thereon, a cutter bar connected to the yoke, a bracket carried on an upstanding arm on the yoke, and cooperable means on said arm and bracket to permit automatic tilting of said cutter bar.

9. In a mowing machine, a coupling arm, a coupling yoke rockably mounted thereon, a cutter bar pivoted to the coupling yoke, a bracket carried by the coupling yoke, a pin journaled in the bracket, and means carried by the arm and engaging the pin for permitting automatic tilting of said cutter bar.

10. In a mowing machine, a coupling arm, a coupling yoke rockably mounted thereon, a cutter bar pivoted to the coupling yoke, a bracket carried by the coupling yoke, a pin journaled in the bracket, and a support pivoted at one end to the arm and having an eye at its other end through which the pin may slide for permitting tilting of said cutter bar.

11. In a mowing machine, a coupling arm, a coupling yoke rockably mounted thereon, a cutter bar pivoted to the coupling yoke, a bracket pivoted to the coupling yoke, a pin carried in the bracket, a support on the arm and having an eye at one end through which the pin may slide to permit rocking of the yoke and bar, and means for regulating the rocking movement of the coupling yoke and cutter bar.

12. In a mowing machine, a coupling arm, a coupling yoke rockably mounted thereon, a cutter bar pivoted to the coupling yoke, a bracket pivoted to the coupling yoke, a threaded pin journaled in the bracket, a support on the arm and having an eye at one end through which the pin may slide to permit rocking of the yoke and bar, and means including a stationary nut for regulating the amount of rocking movement of the coupling yoke and cutter bar upon rotation of the pin.

13. In a mowing machine, a coupling arm, a coupling yoke rockably mounted thereon, a cutter bar pivoted to the coupling yoke, and mechanism including a crank carried on the coupling member and slidably mounted relative to the arm for controlling and permitting a tilting movement of the cutter bar.

In testimony whereof I affix my signature.

CHARLES PEARSON.